(12) United States Patent
Legueux

(10) Patent No.: US 9,789,829 B2
(45) Date of Patent: Oct. 17, 2017

(54) DEVICE FOR INSTALLING CABLE TRUNKING ON A MOTOR VEHICLE BODY PART

(71) Applicant: RENAULT s.a.s., Boulogne-Billancourt (FR)

(72) Inventor: Gilles Legueux, Beynes (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/431,087

(22) PCT Filed: Sep. 19, 2013

(86) PCT No.: PCT/FR2013/052163
§ 371 (c)(1),
(2) Date: Jun. 18, 2015

(87) PCT Pub. No.: WO2014/049236
PCT Pub. Date: Apr. 3, 2014

(65) Prior Publication Data
US 2015/0274094 A1    Oct. 1, 2015

(30) Foreign Application Priority Data
Sep. 25, 2012   (FR) ...................... 12 58988

(51) Int. Cl.
*B60R 16/02*   (2006.01)
*F16L 3/13*   (2006.01)
(Continued)

(52) U.S. Cl.
CPC ............ *B60R 16/0215* (2013.01); *F16L 3/13* (2013.01); *F16L 3/24* (2013.01); *F16L 3/26* (2013.01)

(58) Field of Classification Search
CPC ...... H02M 3/156; H02M 1/32; H02M 31/158; H02M 2001/0041; B60R 16/0215; F16L 3/24; F16L 3/13
(Continued)

(56) References Cited
U.S. PATENT DOCUMENTS 5,806,812 A    9/1998  Jacobs et al.
5,962,814 A *  10/1999 Skipworth .......... B60R 16/0215
                                                     174/135
(Continued)

FOREIGN PATENT DOCUMENTS

DE    44 24 288 A1    1/1996
EP    2 428 715 A1    3/2012
(Continued)

OTHER PUBLICATIONS

International Search Report dated Nov. 6, 2013 in PCT/FR2013/052163 Filed Sep. 19, 2013.
(Continued)

Primary Examiner — Anita M King
(74) *Attorney, Agent, or Firm* — Oblon, McClelland, Maier & Neustadt, L.L.P.

(57) ABSTRACT

A device for installing cable trunking on a motor vehicle body pillar includes cable staples provided on the pillar, which enable cables to be maintained in guidance and a trunking to be snap fitted. Complementary clips engaging with the staples are provided on the trunking. The trunking also includes a transverse bearing raised portion that, at the time of snap fitting, bears against a transverse bearing surface formed by the top of one of the cable staples to lock the trunking in a longitudinal direction when the trunking is snap fitted.

20 Claims, 2 Drawing Sheets

(51) Int. Cl.
*F16L 3/24* (2006.01)
*F16L 3/26* (2006.01)

(58) Field of Classification Search
USPC ....... 248/73, 49; 296/146.1, 146.2; 174/135, 174/136
See application file for complete search history.

(56) References Cited

U.S. PATENT DOCUMENTS

| | | | | |
|---|---|---|---|---|
| 7,140,070 | B2 * | 11/2006 | Yuta | B60N 3/046 16/17 |
| 7,628,447 | B2 * | 12/2009 | Sugimoto | B60R 13/02 248/49 |
| 8,366,059 | B2 * | 2/2013 | Fannon | E05B 79/20 24/16 PB |
| 2004/0108421 | A1 * | 6/2004 | Yuta | B60N 3/046 248/71 |
| 2007/0044990 | A1 * | 3/2007 | Shimadu | B60R 16/0215 174/72 C |
| 2011/0260025 | A1 | 10/2011 | Aoshima et al. | |
| 2014/0008501 | A1 * | 1/2014 | Satou | B60R 13/0275 248/68.1 |

FOREIGN PATENT DOCUMENTS

| | | | | |
|---|---|---|---|---|
| JP | | 2009274535 A | * 11/2009 | |
| JP | WO | 2013051090 A1 | * 4/2013 | ......... B60R 13/0275 |

OTHER PUBLICATIONS

French Preliminary Search Report dated May 14, 2013 in Patent Application No. FR 12 58988 Filed Sep. 25, 2012 (with English translation of categories of cited documents).

* cited by examiner

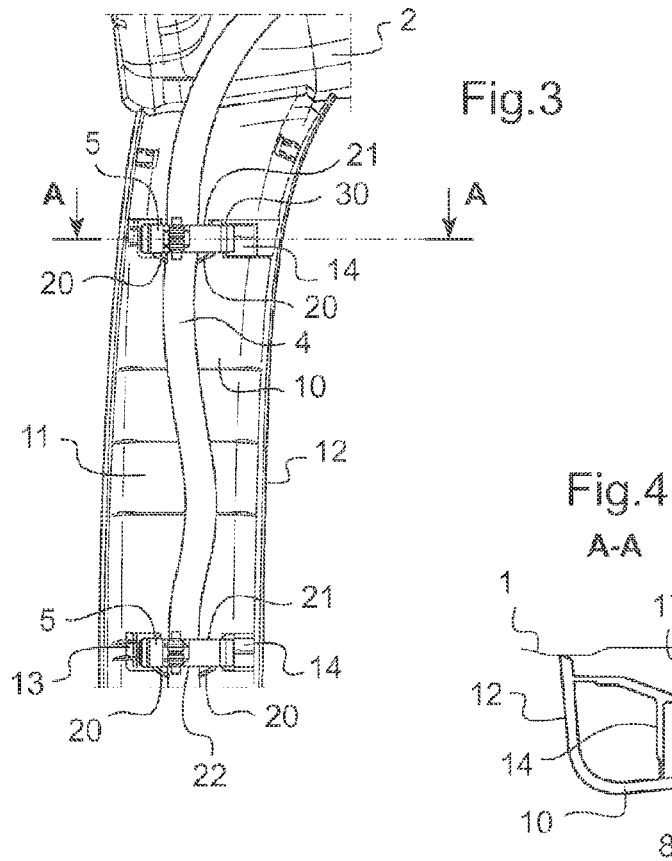
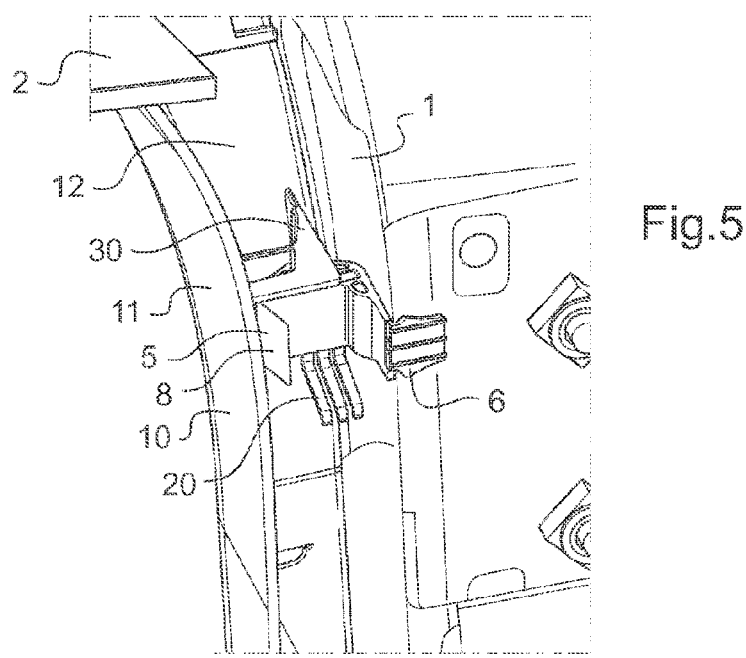

US 9,789,829 B2

DEVICE FOR INSTALLING CABLE TRUNKING ON A MOTOR VEHICLE BODY PART

BACKGROUND

The present invention relates to a device for assembling cable trunking on a motor vehicle body component.

It involves positioning a trunking by means of clip-fitting to the wall of a motor vehicle body component, in particular a bodywork pillar, such as a B-pillar or a windscreen pillar. In order to hide the cables which it is necessary to pass along these pillars, it is known to clip-fit to the wall a cable trunking which is constituted by a C-shaped profile-member. The trunking is in principle clip-fitted so as to move into abutment without any play with a surface transverse to the trunking, in particular with the roof trim in the case of a bodywork pillar. One problem which is encountered is that the trunkings which are clip-fitted are often positioned in an imprecise manner with respect to this roof trim and leave a visible play or, even when they are correctly positioned at initial assembly, the vibrations of the bodywork during driving end up moving the trunking and creating an unattractive play.

BRIEF SUMMARY

An object of the invention is to find a solution to this problem.

The object of the invention is achieved with a device for assembling a cable trunking on a motor vehicle body component, characterized in that it comprises:
  on the body component,
    at least one cable clip which comprises, on the one hand, means for retaining a cable in a guided manner and, on the other hand, means for clip-fitting the trunking,
    at least one transverse support surface which is positioned and fixed, directly or indirectly, on the body component in order to form a topological reference location,
  on the trunking, complementary clip-fitting means which cooperate with the means of the clips(s) in order to allow the trunking to be clip-fitted to the clip(s), this clip-fitting fixing the position of the trunking in directions transverse to the trunking, the trunking further comprising a transverse support relief which, during the clip-fitting operation, is supported on the transverse support surface of the body component in order to block the trunking in a longitudinal direction of the trunking when it is clip-fitted.

In this manner, the clip-fitted trunking may be positioned precisely relative to the environment thereof and in particular relative to the roof trim and the position thereof will not change during the use of the vehicle.

Advantageously, the transverse support surface is constituted by a reference surface of a cable clip, for example, an upper portion of the clip.

The support relief is advantageously a transverse rib which is provided in the trunking. It is formed so as to press on the transverse support surface and in particular on the reference surface which is predetermined on one clip from the group of cable clips.

BRIEF DESCRIPTION OF THE DRAWINGS

Other features and advantages of the invention will be appreciated from the following description of an embodiment. Reference will be made to the appended drawings, in which:

FIG. 3 is a view showing the inner side of the trunking of the invention, with the cable and the cable clips, FIG. 4 is a cross-section taken along A-A of FIG. 3, FIG. 5 is a vertical section of the pillar and the trunking, extending through the center of a cable clip.

DETAILED DESCRIPTION

Figure 1:
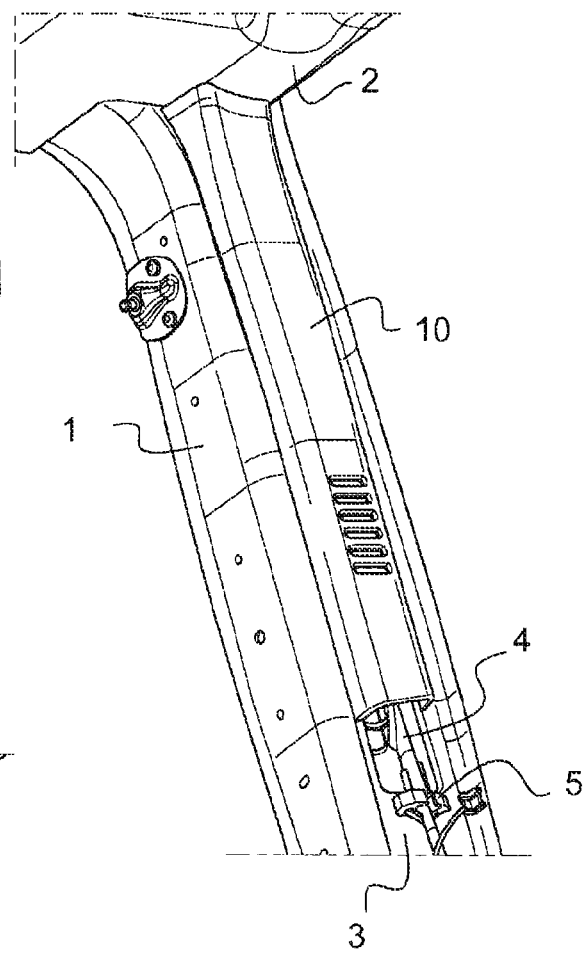
FIG. 1 is a perspective view of a sub-roof bodywork pillar which is provided with a trunking according to the invention.
Figure 2:
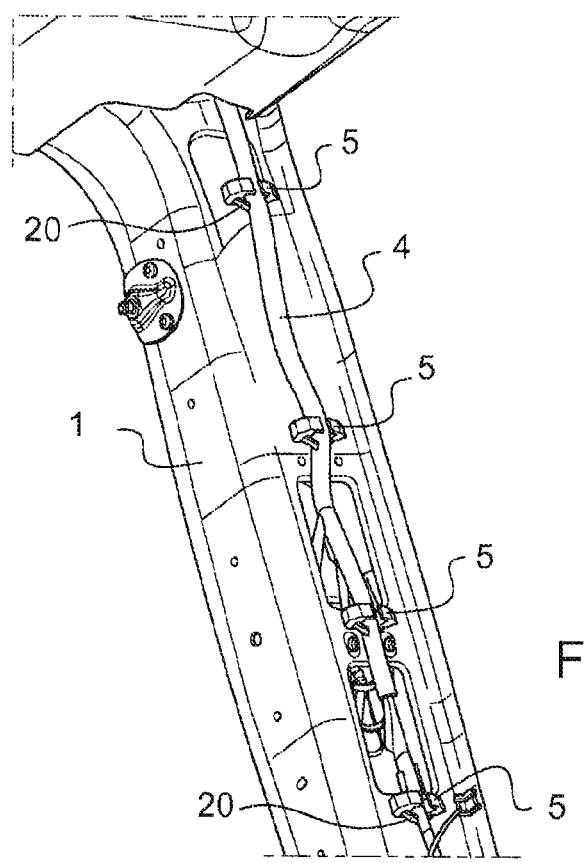
FIG. 2 is a view similar to FIG. 1 with the trunking retracted.

The Figures show an oblique or vertical bodywork pillar 1, such as a bodywork B-pillar or a windscreen pillar, constituted by a sheet metal profile-member. The pillar 1 connects a lower body portion to the roof which is covered by a roof trim 2.

On a wall of the metal profile-member which forms the pillar 1 and which is optionally shaped in the manner of a groove 3, it is possible to retain and/or guide a cable 4 by means of cable clips 5 which have been fixed beforehand in holes which are provided in the wall of the profile-member. To this end, the clips comprise, on the one hand, means for anchoring in the pillar and, on the other hand, means for receiving and retaining or guiding the cable and finally means for clip-fitting a trunking.

Each clip 5 is substantially in the form of a resilient C-shaped clamping member which is provided with a fixing foot 6 which can be snap-fitted (by means of clip-fitting) in a hole of the wall of the profile-member 1. The foot 6 which is, for example, cylindrical in profile in the form of "fir teeth" constitutes a means for rapidly anchoring the clip in the wall of the profiled pillar 1 which places the clip in a fixed and predetermined position. The C-shaped clamping member comprises two resilient branches 7, 7' between which the cable 4 can be introduced and is retained and/or guided as a result of the hook-like shape of the branches which are turned over toward the inner side of the clamping member. The branches 7, 7' constitute the means for receiving and retaining or guiding the cable. The clip 5 also comprises, at one side and the other of the branches 7, 7', two wings 8 and 9 which are intended to receive elements for hooking the cable trunking 10 which is intended to be fixed above the cable 4 in order to protect and conceal it as shown in FIG. 1. The wings 8 and 9 constitute the means for clip-fitting the trunking. The clip 5 also comprises at the lower surface thereof resilient hooks 20 which are intended to resiliently press on the cable 4 and to guide it or retain it. As can be seen in FIG. 3, each clip, when viewed from the front (parallel with the foot 6 thereof), has a substantially rectangular profile with an upper face 21 and a lower face 22. The upper face 21, or at least an element thereof, is intended to act as a topological reference and abutment surface for an element of the trunking which will be described below. This upper surface or upper support portion 21 is in fact formed by the upper edge of the branches 7, 7' and/or one and/or the other of the wings 8, 9.

The trunking 10 is in the form of a C-shaped channel, with a base 11 and two wings 12 which are substantially in abutment with the wall of the profile-member 1 when the trunking 10 is fixed. For the fixing thereof, the trunking 10 comprises from place to place molded profile-members 13 and 14 whose shape is intended to cooperate with the clips 5 in order to allow the trunking 10 to be clip-fitted to said clips. The clip-fitting profile-member 13 extends from the base 11 and terminates with a hook 16 which is engaged on a complementary hook which is formed on the outer portion of the branch 7'. The profile-member 14 extends from the base 11 and the wing 12 and comprises a hook 17 which engages in an aperture which is formed in the wing 8 and which comprises toward the outer side a ramp which, when the trunking 10 is positioned, allows the hook 17 to slide on this ramp and the wing 8 to be pivoted resiliently toward the inner side of the clip until the hook 17 can be introduced into said aperture.

The elements which have been described above allow the trunking 10 to be clip-fitted to the bodywork pillar 1 and to be retained in a specific position but do not ensure precisely the vertical positioning thereof, which may result in an initial visible play between the upper portion of the trunking 10 and the roof trim 2. Furthermore, even in the absence of initial play if the trunking has been carefully positioned, the vibrations of the vehicle during operation may bring about a displacement of the trunking in the longitudinal direction thereof and cause a play to appear. In order to ensure precise vertical positioning and an absence of play, both during assembly and during use of the vehicle, there is provided according to the invention a vertical support for the trunking on a reference element of the assembly, and in practice there is provision for adding to the vertical trunking a horizontal rib 30, for example, formed by means of molding in the region of the clip-fitting profile-member 14, this rib 30 pressing on the upper horizontal surface 21 of one of the clips 5 which is selected by way of reference. As can be seen, the rib 30 is formed in a square manner between the base 11 and the wing 12 of the trunking, these two connections providing it with a large degree of stability. In this manner, the vertical position of the trunking 10 is fixed with precision relative to the selected reference surface 21, in this instance the upper portion of a clip 5 (only one of several cable clips), and it is therefore possible to ensure that the clip-fitting of the trunking 10 places it without play relative to the roof trim 2. In this manner, the support rib 30 fixes the starting position of the trunking 10 on the pillar 1 and retains it during use of the vehicle.

The invention claimed is:

1. A device for assembling cable trunking on a motor vehicle body component, comprising:
   at least one cable clip configured to be positioned on the body component, the at least one cable clip including means for retaining a cable in a guided manner and means for clip-fitting the trunking,
   at least one transverse support surface which is positioned and fixed on the body component to form a topological reference location,
   a cable trunking, the trunking including clip-fitting means which cooperate with the means for clip-fitting to fix the trunking to the at least one cable clip, the clip-fitting means and the means for clip-fitting fix the position of the trunking in directions transverse to the trunking, the trunking further comprising a transverse support relief which, when the trunking is fixed to the at least one cable clip, is supported on the transverse support surface to block the trunking in a longitudinal direction of the trunking,
   wherein the support relief is a transverse rib which is provided in the trunking.

2. The device as claimed in claim 1, wherein the transverse support surface is a reference surface of the at least one cable clip.

3. The device as claimed in claim 2, wherein the reference surface of the cable clip is formed by an upper portion of the cable clip.

4. The device as claimed in claim 1, wherein the at least one cable clip further includes means for anchoring the cable clip in the body component.

5. The device as claimed in claim 4, wherein the means for anchoring the cable clip in the body component includes a snap-fitting foot.

6. The device as claimed in claim 1, wherein the body component is a bodywork pillar.

7. The device as claimed in claim 6, wherein the bodywork pillar is a B-pillar or a windscreen pillar.

8. The device as claimed in claim 1, wherein the trunking includes two wings and a base between the two wings.

9. The device as claimed in claim 8, wherein the clip-fitting means of the trunking includes a first profile-member that extends only from the base and a second profile-member that extends from the base and one of the two wings.

10. The device as claimed in claim 9, wherein the means for clip-fitting includes a hook and a wing having an aperture.

11. The device as claimed in claim 10, wherein the first profile-member includes a hook that engages in the aperture of the wing of the means for clip-fitting and the second profile-member includes a hook that engages with the hook of the means for clip-fitting to fix the trunking to the at least one cable clip.

12. A device for assembling cable trunking on a motor vehicle body component, comprising:
   at least one cable clip configured to be positioned on the body component, the at least one cable clip including means for retaining a cable in a guided manner and means for clip-fitting the trunking,
   at least one transverse support surface which is positioned and fixed on the body component to form a topological reference location,
   a cable trunking, the trunking including clip-fitting means which cooperate with the means for clip-fitting to fix the trunking to the at least one cable clip, the clip-fitting means and the means for clip-fitting fix the position of the trunking in directions transverse to the trunking, the trunking further comprising a transverse support relief which, when the trunking is fixed to the at least one cable clip, is supported on the transverse support surface to block the trunking in a longitudinal direction of the trunking,
   wherein the trunking includes two wings and a base between the two wings, and
   wherein the clip-fitting means of the trunking includes a first profile-member that extends only from the base and a second profile-member that extends from the base and one of the two wings.

13. The device as claimed in claim 12, wherein the means for clip-fitting includes a hook and a wing having an aperture.

14. The device as claimed in claim 13, wherein the first profile-member includes a hook that engages in the aperture of the wing of the means for clip-fitting and the second profile-member includes a hook that engages with the hook of the means for clip-fitting to fix the trunking to the at least one cable clip.

15. The device as claimed in claim 12, wherein the transverse support surface is a reference surface of the at least one cable clip.

16. The device as claimed in claim 15, wherein the reference surface of the cable clip is formed by an upper portion of the cable clip.

17. The device as claimed in claim 12, wherein the at least one cable clip further includes means for anchoring the cable clip in the body component.

18. The device as claimed in claim 17, wherein the means for anchoring the cable clip in the body component includes a snap-fitting foot.

19. The device as claimed in claim 17, wherein the support relief is a transverse rib which is provided in the trunking.

20. The device as claimed in claim 12, wherein the body component is a bodywork pillar.

* * * * *